R. PETERSEN.
CABLEWAY.
APPLICATION FILED JAN. 7, 1913.
1,068,074.
Patented July 22, 1913.
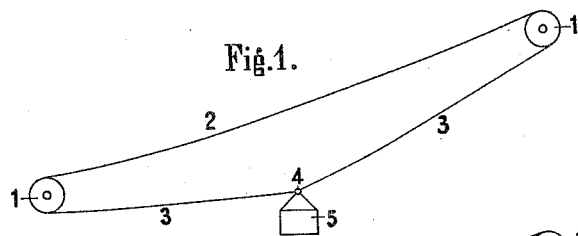
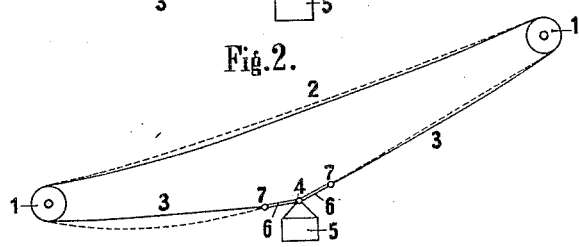
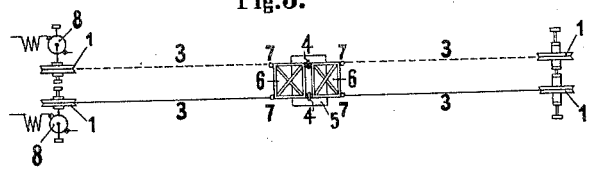
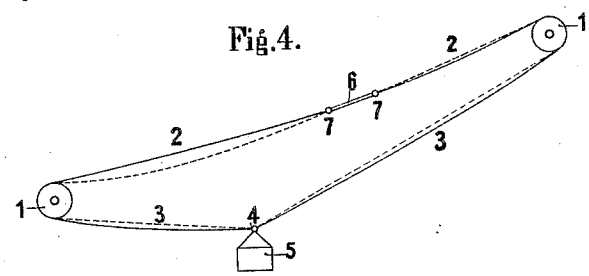
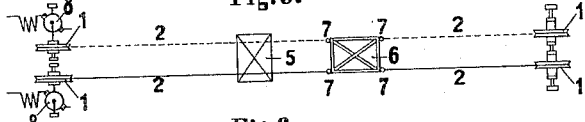
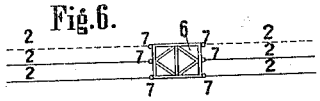
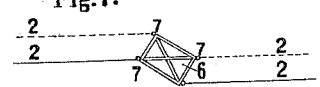
Witnesses:
H. P. Roberts
C. A. Mason
Inventor:
Richard Petersen,
by W. Schoenborn,
attorney.

UNITED STATES PATENT OFFICE.

RICHARD PETERSEN, OF BERLIN-SCHLACHTENSEE, GERMANY.

CABLEWAY.

1,068,074.　　　　　Specification of Letters Patent.　　Patented July 22, 1913.

Application filed January 7, 1913.　Serial No. 740,583.

*To all whom it may concern:*

Be it known that I, RICHARD PETERSEN, a citizen of the German Empire, residing at Berlin-Schlachtensee, in the German Empire, have invented certain new and useful Improvements in Cableways, of which the following is a specification.

This invention relates to cableways.

In my patent application of July 24, 1911, Serial No. 640,328 a cableway is described wherein the cage is pivotally connected to a rope which moves with the cage and which serves simultaneously as the supporting and traction rope. Such an arrangement, as illustrated in Figure 1 of the accompanying drawing, is readily employable for the conveyance of goods by means of a single rope. For the conveyance of passengers it is however preferable to employ several ropes, which conjointly carry and move the cage, and to each of which the latter is pivotally connected. By this means greater security is obtained against the danger of breakage of the rope. If the ropes are guided at some distance one from another, a steadier position of the cage during motion is so obtained. In this manner oscillations of the cage transverse to the rope can be practically eliminated. When driving with several ropes the difficulty however arises that the ropes do not run uniformly. Should the driving-sheaves for the ropes be driven at the same peripheral speed by means of a common motor, the very small differences in diameter of the driving-sheaves produce such differences in the driven rope that there consequently arise appreciable differences in the tension of the ropes, the latter differences being observable by the differences in sag. As is well-known differences in the diameters of the driving-sheaves are unavoidable. There also act in the same manner as such latter differences the differences in slip of the various ropes on their driving-sheaves. The differences in the lengths of the rope which are driven at one journey of the cage are not reduced to zero at the return journey, but they tend to further increase, so that after a number of journeys backward and forward there may arise inadmissible differences in the sag and therefore in the tension of the various portions of the rope. This fact is attributable to the frictional resistance between rope and driving-sheave acting in the same direction during the descent as during the ascent. The difference in the tensions in the various portions of the rope is indicated by the tendency to displace, in the line of the ropes, the points of suspension of the cage relatively one to another, and consequently to rotate the cage around its vertical axis. The same drawbacks are attached to all cable ways wherein two or more draw-ropes are employed to move the cage.

A primary object of my invention is to obviate the above defects, and to this end, while employing several ropes, I provide each of the ropes with its own motor, and moreover the driving motors are so designed or regulated that they all have the same output. If therefore one of the driving motors is more heavily loaded it runs slower than the others, and vice versa. This method is however only adequate if that rope which outruns the other simultaneously requires a larger force to propel it. This is readily obtained *e. g.* in a steeply inclined cableway. In other cases it is necessary to compel this condition by a special device. For this purpose a stiff frame is employed to which the ropes are fastened at at least two points. A rigid coupling between the various driving shafts may be provided to meet cases of interruptions to the drive.

Figs. 2 to 8 in the accompanying drawing diagrammatically illustrate, by way of example, three embodiments of my invention. Of these figures, Figs. 2 and 3 are elevation and plan respectively of one form of my device, Fig. 4 is an elevation of two other forms, of which Fig. 5 is a plan of the one and Fig. 6 a part plan of the other, and Fig. 7 shows a portion of the device illustrated in Fig. 5, the rigid frame being now in another position.

In all the figures one of the ropes is indicated by the broken lines.

The rope-sheaves are moreover indicated by 1, the upper portions of the rope by 2, the lower portions by 3, the suspension-joint of the cage by 4, the cage itself by 5, the rigid frame by 6, the junction-places of the ropes with the rigid frame by 7 and the motors by 8. The sheaves of each individual rope are independent of those of the remaining ropes. One of the sheaves of each rope is the driving sheave and is driven by a motor 8, a special motor being employed for each rope or track of rope. The motors employed are series electric motors for direct current, as the drawing diagrammatically shows. These motors have such a load characteristic that they always deliver the same output. The driving-sheaves of all the ropes lie at the same end of the ropeway. The various portions of the rope are in every case pivotally connected to the rigid frame by means of joints 7.

In the arrangement shown in Figs. 2 and 3 there are two rigid frames pivotally connected with the cage, the ropes being also connected to them. Both rigid frames act conjointly as if there were only a single one.

In the embodiment shown in Figs. 4, 5 and 6 the rigid frame 6 is connected in the upper portion 2 of the rope, in fact at the point opposite the joint 4. Fig. 6 shows an arrangement with three ropes.

The frame 6 operates in the following manner:—Assume that one rope outruns the other. The rigid frame 6 thereby must take up an oblique position as shown exaggerated in Fig. 7. This oblique position is however so connected with changes in the tension of the adjacent portions of the rope, that those portions of the rope become more highly tensioned which approach the vertical plane normally centrally between the two rope-tracks. When there is an oblique position such as shown in Fig. 7, the lower front portion and upper rear portion of the rope must take the whole load, while the lower rear and upper front portions must be without tension. (As owing to the rope's own weight such a condition of things is altogether out of the question, it follows that the limit of obliquity illustrated in Fig. 7 can never be obtained.) It is moreover readily understood from Figs. 2 and 4 that, if for example the front rope runs onto the driving sheave with a greater tension than the rear rope, the front rope must on the other hand leave the driving sheave with a reduced tension. From the difference between the tensions of the portions of the rope which run on and run off it is readily understood that the rope which runs on the driving sheave with the greater tension exerts a greater circumferential force on the driving sheave than the rope which runs on this sheave with less tension. The greater circumferential force which one or another rope exerts on the driving sheave then however effects such a change in speed in the appertaining motor that any gain or loss in way by the various ropes is nullified, and the rigid frame returns to its normal position. Thus the speed becomes reduced of that motor or driving sheave, whose rope has got in advance of the other ropes. This automatic compensation by means of the driving machines occurs with very small differences in rope tension. The differences in the tensions of the various portions of the rope and the oblique positioning of the cage are consequently brought within such narrow limits that neither the safety of the plant is endangered nor are the changes in the position of the cage inconvenient to the passengers.

I claim:—

1. In a cableway, the combination with a plurality of traction ropes, of a cage pivotally connected to the ends of all the ropes, motors corresponding in number with said ropes, each motor being operatively connected with one of the ropes, and means for regulating said motors to give equal outputs.

2. In a cableway, the combination with a plurality of movably mounted combined supporting and traction ropes forming a plurality of rope-tracks, of a cage pivotally connected to ends of all the ropes, motors corresponding in number with said rope-tracks, each motor being operatively connected with one of the rope-tracks, means for regulating said motors to give equal outputs, and a rigid frame inserted in the rope-tracks and pivotally connected to all the ropes.

3. In a cableway, the combination with a plurality of movably mounted combined supporting and traction ropes forming a plurality of rope-tracks, of a cage pivotally connected to ends of all the ropes, motors corresponding in number with said rope-tracks, each motor being operatively connected with one of the rope-tracks, means for regulating said motors to give equal outputs, and a rigid frame inserted in the rope-tracks and pivotally connected to all the ropes, said frame being inserted at that place in the rope-tracks which is opposite the place where the cage is pivotally connected therein.

In testimony whereof I have affixed my signature in presence of two witnesses.

RICHARD PETERSEN.

Witnesses:
HENRY HASPER,
WOLDEMAR HAUPT.